(12) United States Patent
Funazukuri et al.

(10) Patent No.: US 11,491,660 B2
(45) Date of Patent: Nov. 8, 2022

(54) COMMUNICATION SYSTEM AND METHOD FOR CONTROLLING COMMUNICATION SYSTEM

(71) Applicant: Toyota Jidosha Kabushiki Kaisha, Toyota (JP)

(72) Inventors: Mina Funazukuri, Tokyo-to (JP); Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 16/819,683

(22) Filed: Mar. 16, 2020

(65) Prior Publication Data

US 2020/0298412 A1 Sep. 24, 2020

(30) Foreign Application Priority Data

Mar. 18, 2019 (JP) .............................. JP2019-049961

(51) Int. Cl.
| | | |
|---|---|---|
| *B25J 9/16* | (2006.01) | |
| *H04N 5/225* | (2006.01) | |
| *H04R 1/04* | (2006.01) | |
| *H04R 3/00* | (2006.01) | |
| *G06N 3/00* | (2006.01) | |
| *G05B 19/042* | (2006.01) | |
| *H04R 1/40* | (2006.01) | |
| *G06V 40/16* | (2022.01) | |

(52) U.S. Cl.
CPC .......... *B25J 9/1697* (2013.01); *G05B 19/042* (2013.01); *G06N 3/008* (2013.01); *G06V 40/171* (2022.01); *H04N 5/2253* (2013.01); *H04R 1/04* (2013.01); *H04R 1/406* (2013.01); *H04R 3/005* (2013.01); *G05B 2219/2666* (2013.01)

(58) Field of Classification Search
CPC .. B25J 9/1697; G05B 19/042; G05B 19/0426; G05B 2219/2666; G05B 2219/39391; G06N 3/008; G06V 40/171; H04N 5/2253; H04N 5/2257; H04R 1/04; H04R 1/406; H04R 3/005; H04R 2420/07; G10L 15/22; G06F 3/012
See application file for complete search history.

(56) References Cited

U.S. PATENT DOCUMENTS

2018/0374494 A1* 12/2018 Yamaya ............... G06K 9/0057
2019/0028817 A1* 1/2019 Gabai ................ H04N 5/23238

FOREIGN PATENT DOCUMENTS

| JP | 2007-181888 A | | 7/2007 |
|---|---|---|---|
| JP | 2008-126329 A | | 6/2008 |
| JP | 2018-149625 A | | 9/2018 |
| JP | 2018149625 A | * | 9/2018 |

* cited by examiner

*Primary Examiner* — Yogeshkumar Patel
(74) *Attorney, Agent, or Firm* — Dinsmore & Shohl LLP

(57) ABSTRACT

A communication system according to the present disclosure includes a camera configured to be able to photograph a user who is a communication partner and a microphone configured to be able to form a beam-forming in a specific direction. The control unit identifies a position of the mouth of a user using an image of the user taken by the camera and controls a position of a head part so that the identified position of the mouth of the user is included in a region of the beam-forming.

5 Claims, 10 Drawing Sheets

COMMUNICATION SYSTEM AND METHOD FOR CONTROLLING COMMUNICATION SYSTEM

CROSS REFERENCE TO RELATED APPLICATIONS

This application is based upon and claims the benefit of priority from Japanese patent application No. 2019-049961, filed on Mar. 18, 2019, the disclosure of which is incorporated herein in its entirety by reference.

BACKGROUND

The present disclosure relates to a communication system and a method for controlling a communication system.

In recent years, communication systems that communicate with users have been developed. Japanese Unexamined Patent Application Publication No. 2008-126329 discloses a technique related to a voice recognition robot that performs an action by recognizing a voice of a user.

SUMMARY

The voice recognition robot disclosed in Japanese Unexamined Patent Application Publication No. 2008-126329 includes a holding unit that holds a microphone. Then, the position of the mouth of a user is identified using an image of the user taken by a camera, and the posture of the holding unit is controlled so that the microphone held by the voice recognition robot approaches the mouth of the user.

However, the speech recognition robot disclosed in Japanese Unexamined Patent Application Publication No. 2008-126329 has a problem that as it is configured so that the microphone is held by the holding unit, the apparatus configuration becomes complicated. Further, in the communication system, as it is necessary to appropriately communicate with a user, it is necessary to accurately recognize a voice of the user. Accordingly, there is a need for a communication system that has a simple apparatus configuration and that can accurately recognize a voice of a user.

In view of the aforementioned problem, an object of the present disclosure is to provide a communication system that has a simple apparatus configuration and that can accurately recognize a voice of a user, and a method for controlling a communication system.

A first exemplary aspect is a communication system, including: a main body part; a head part attached to the main body part so that the head part can be displaced with respect to the main body part; a control unit configured to be able to control a position of the head part with respect to the main body part; a camera provided in the head part and configured to be able to photograph a user who is a communication partner; and a microphone provided in the head part and configured to be able to form a beam-forming in a specific direction. The control unit identifies a position of a mouth of the user using an image of the user taken by the camera and controls the position of the head part so that the identified position of the mouth of the user is included in a region of the beam-forming.

In the above-described communication system, the camera configured to be able to photograph a user and the microphone configured to be able to form a beam-forming in a specific direction are provided in the head part. Thus, it is possible to omit a holding unit that holds the microphone, and accordingly to make the apparatus configuration of the communication system simple. Further, the position of the mouth of the user is identified using the image of the user who is a communication partner, and the position of the head part is controlled so that the identified position of the mouth of the user is included in a region of the beam-forming. Accordingly, it is possible to accurately recognize a voice of the user.

In the above-described communication system, the control unit may be further configured to be able to control a direction of a line of sight of an eye part provided in the head part. Further, the control unit may control the direction of the line of sight so as to face in a direction of a face of the user when the control unit controls the position of the head part.

By controlling a direction of the line of sight of the communication system so as to face in a direction of the face of a user as described above, it is possible to prevent the line of sight of the communication system from deviating from the user. Accordingly, it is possible to give an impression to the user that the communication system is carefully listening to him/her.

In the above-described communication system, the control unit may identify a position of the face of the user using the image of the user taken by the camera and control the direction of the line of sight so as to face in the direction of the face of the user.

In the above-described communication system, the control unit may control the direction of the line of sight based on an amount of movement of the head part when the control unit controls the position of the head part.

In the above-described communication system, the control unit may calculate coordinates of the position of the mouth of the user using the image of the user taken by the camera, and calculate the amount of movement of the head part using the calculated coordinates of the position of the mouth and a relative positional relation between the microphone and the camera.

Another exemplary aspect is a method for controlling a communication system, the communication system including: a main body part; a head part attached to the main body part so that the head part can be displaced with respect to the main body part; a camera provided in the head part and configured to be able to photograph a user who is a communication partner; and a microphone provided in the head part and configured to be able to form a beam-forming in a specific direction, the method including: photographing a user who is a communication partner; identifying a position of a mouth of the user using the photographed image of the user; and controlling a position of the head part so that the identified position of the mouth of the user is included in a region of the beam-forming.

In the above-described method for controlling a communication system, the position of the mouth of the user is identified using the image of the user who is a communication partner, and the position of the head part is controlled so that the identified position of the mouth of the user is included in a region of the beam-forming of the microphone. Accordingly, it is possible to accurately recognize a voice of the user.

The above-described method for controlling a communication system may further include controlling a direction of the line of sight so as to face in a direction of a face of the user when the control unit controls the position of the head part.

By controlling a direction of the line of sight of the communication system so as to face in a direction of a face of a user as described above, it is possible to prevent the line of sight of the communication system from deviating from the user. Accordingly, it is possible to give an impression to the user that the communication system is carefully listening to him/her.

According to the present disclosure, it is possible to provide a communication system that has a simple apparatus configuration and that can accurately recognize a voice of a user, and a method for controlling the communication system.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment of the present disclosure is described hereinafter with reference to the drawings.

Figure 1:
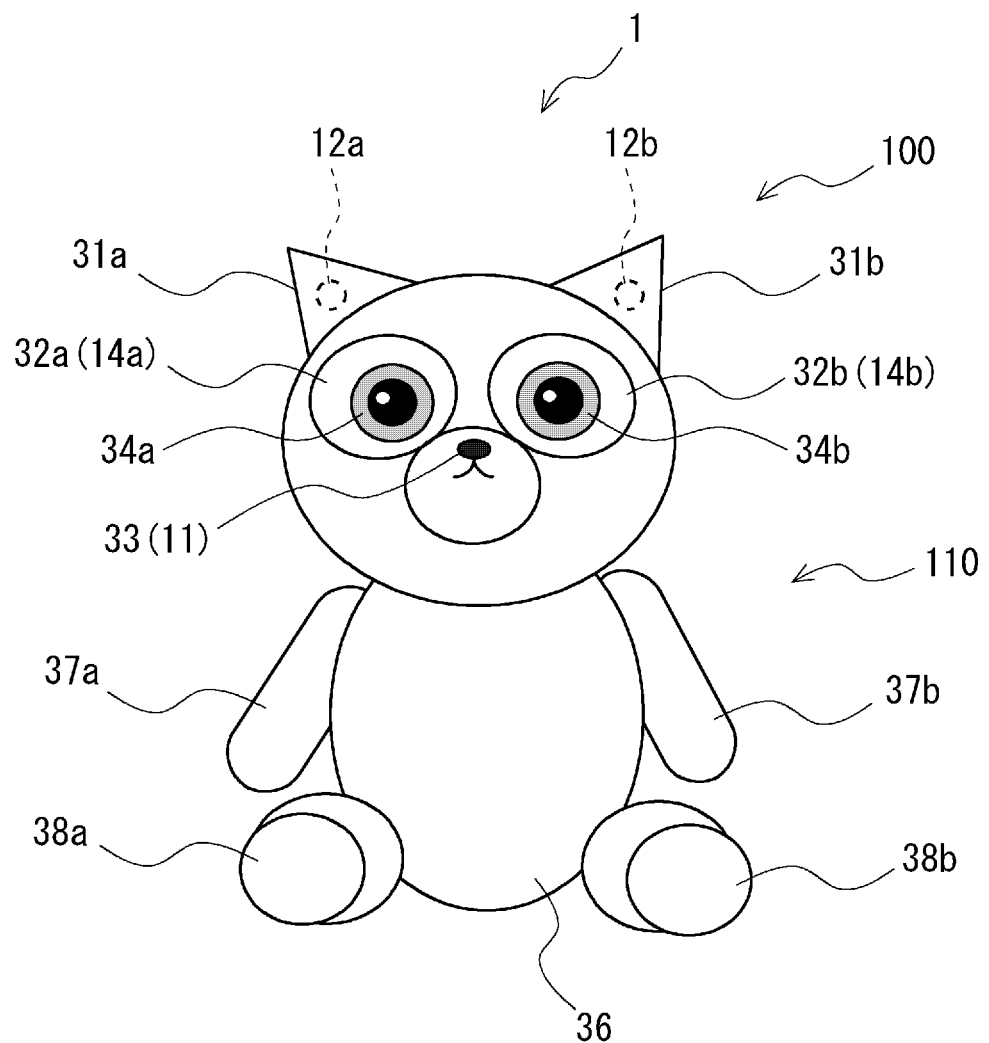
FIG. 1 is a front view showing an example of an appearance configuration of a communication system according to an embodiment.
Figure 2:
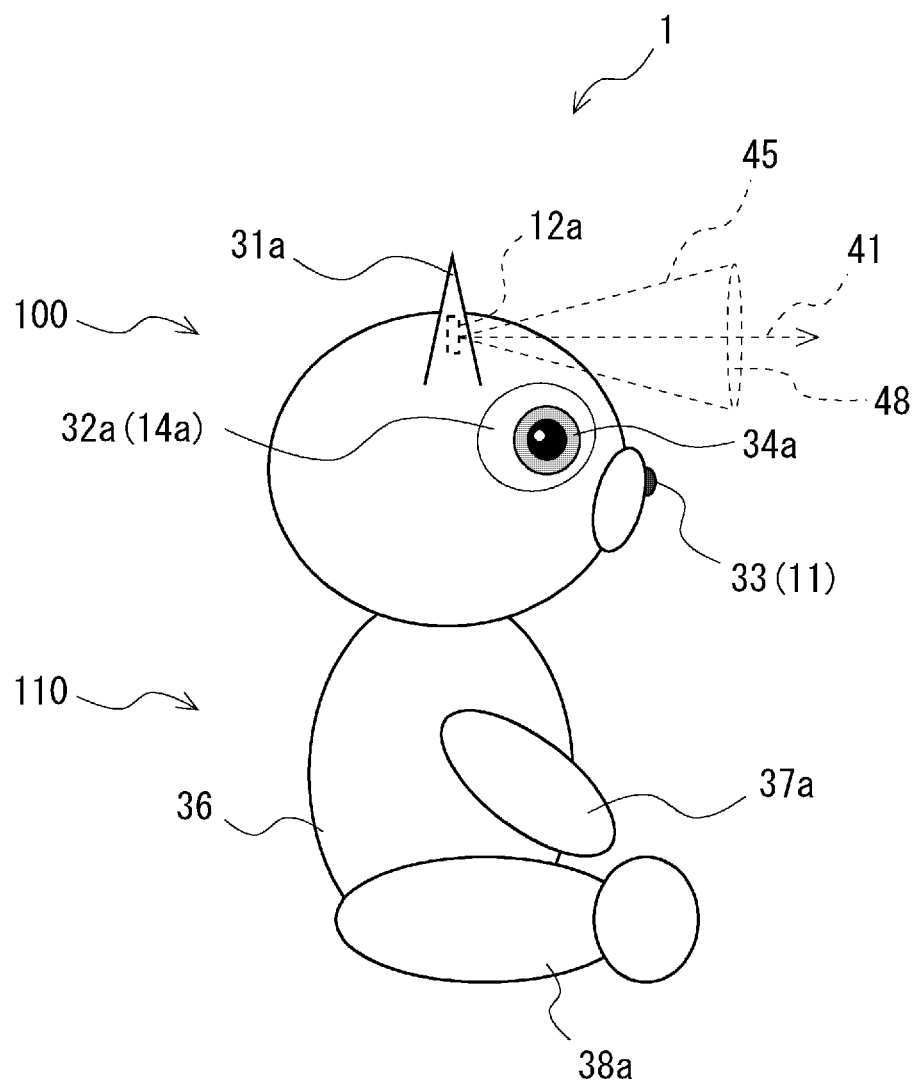
FIG. 2 is a side view showing an example of an appearance configuration of the communication system according to the embodiment.

FIGS. 1 and 2 are a front view and a side view, respectively, each of which shows an example of an appearance configuration of a communication system according to this embodiment. As shown in FIGS. 1 and 2, a communication system 1 according to this embodiment includes a head part 100 and a main body part 110. The head part 100 is attached to the main body part 110 so that the head part can be displaced with respect to the main body part 110. In the head part 100, ear parts 31a and 31b, eye parts 32a and 32b, and a nose part 33 are provided. In the main body part 110, a body part 36, arm parts 37a and 37b, and leg parts 38a and 38b are provided. Although each of FIGS. 1 and 2 shows an apparatus (robot) having an appearance that imitates an animal as an example, the appearance configuration of the communication system according to this embodiment is not limited to this and can be freely determined.

Microphones 12a and 12b are provided in the ear parts 31a and 31b, respectively. By using the microphones 12a and 12b, it is possible to pick up sounds around the communication system 1 (in particular, a voice of a user). In this embodiment, each of the microphones 12a and 12b is configured so that it can form a beam-forming in a specific direction. For example, as shown in FIG. 2, the microphone 12a is configured so that it can form a substantially conical beam-forming 45 having a predetermined angle around a specific direction 41.

The microphones 12a and 12b may each independently form a beam-forming, or one beam-forming may be formed using both of the microphones 12a and 12b.

For example, when the microphones 12a and 12b each independently form a beam-forming, a plurality of microphones (e.g., nondirectional microphones) are provided in each of the microphones 12a and 12b. Then, by performing beamforming processing on each of the voice signals picked up by the plurality of microphones, it is possible to form the beam-forming 45 having directivity in the specific direction 41 independently in each of the microphones 12a and 12b.

Further, for example, when one beam-forming is formed using both of the microphones 12a and 12b, it is possible to form the beam-forming 45 having directivity in the specific direction 41 by performing beamforming processing using both the voice signals picked up by the microphone 12a and the voice signals picked up by the microphone 12b.

For example, the beamforming processing can be performed by a control unit 10. Further, the beamforming processing may be performed by a CPU incorporated in a microphone array of the microphone 12. Further, in this embodiment, a directional microphone may be used for each of the microphones 12a and 12b. Note that the microphones 12a and 12b may be provided only in one of the ear parts 31a and 31b, and may be provided in a part (e.g., a forehead) of the head part 100 other than the ear parts 31a and 31b. In the following, when the microphones 12a and 12b are referred to without being distinguished from each other, they are simply referred to as a microphone 12. The same applies to the other components (an eye part 32 and the like).

A camera 11 is provided in the nose part 33. The camera 11 photographs a space in front of the communication system 1 (in particular, a user who is a communication partner). Further, the nose part 33 projects forward from the head part 100 to imitate a nose of an animal. By providing the camera 11 at a position projected from the head part 100 as described above, it is possible to gives a wider view of the front of the communication system 1 from the camera 11 (i.e., a wide angle photographing can be performed).

In the communication system 1 according to this embodiment, the microphones 12a and 12b are fixed to the ear parts 31a and 31b, and the camera 11 is fixed to the nose part 33. Accordingly, even when the head part 100 is moved with respect to the main body part 110, the relative positional relation between the microphones 12a and 12b and the camera 11 remains fixed.

Further, as shown in FIG. 1, the eye parts 32a and 32b are provided in the head part 100. Each of the eye parts 32a and 32b can be formed using the respective displays 14a and 14b. That is, a line of sight of the communication system 1 can be represented by displaying eye images 34a and 34b on the respective displays 14a and 14b. A direction of the line of sight of the communication system 1 can be controlled by changing the eye images 34a and 34b displayed on the displays 14a and 14b. Note that the image of the eyes may include not only the image of the eyeball but also images of elements related to the eyes such as eyelids, eyebrows, and tears. Further, the displays 14a and 14b can be composed of, for example, a liquid crystal panel or an organic EL panel.

Note that the eye parts 32a and 32b may be formed using, for example, models that imitate eyes and a servo motor that drives the models of the eyes, in addition to the displays 14a and 14b. In this case, a direction of the line of sight of the communication system 1 can be changed by displacing the models of the eyes using the servo motor.

Figure 3:
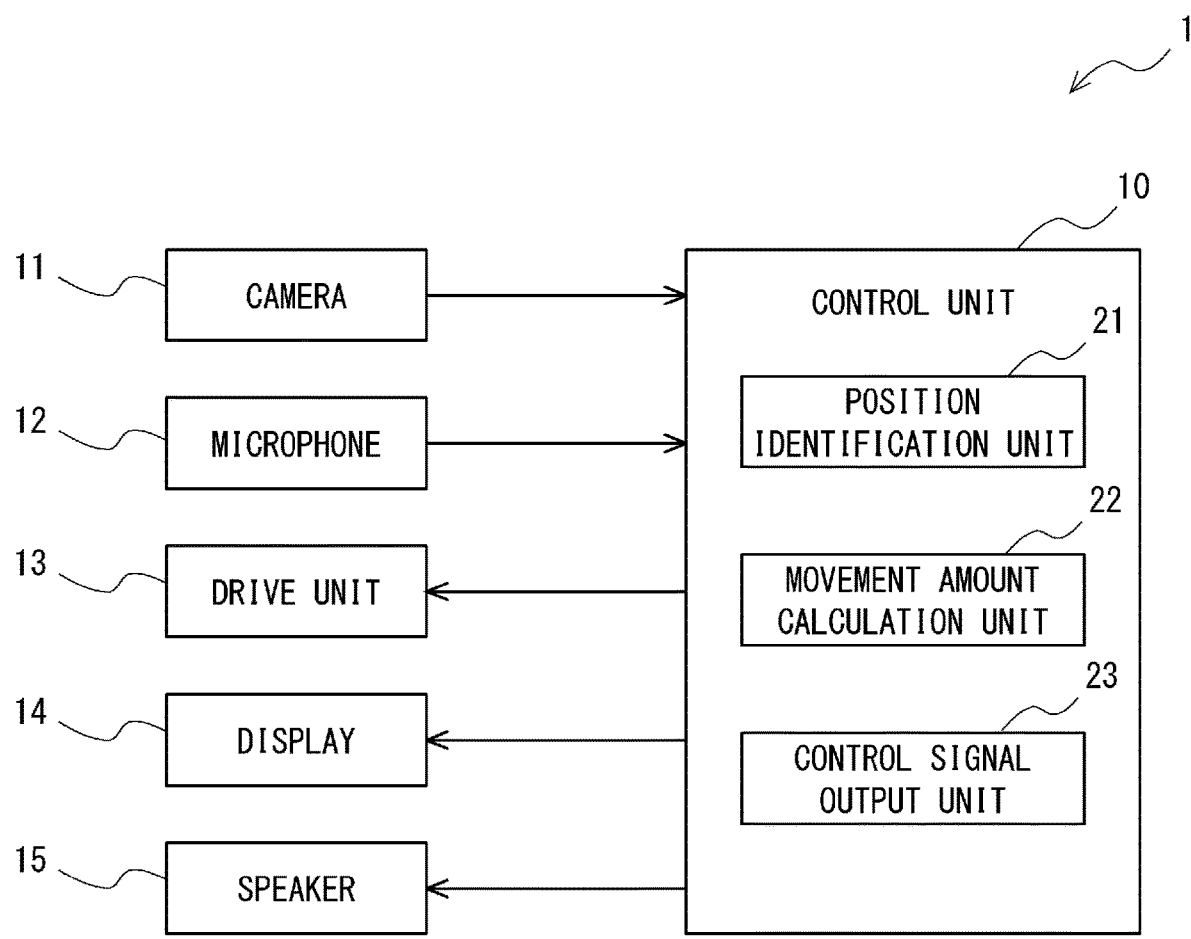
FIG. 3 is a block diagram showing an example of a system configuration of the communication system according to the embodiment.

Next, the system configuration of the communication system according to this embodiment is described with reference to a block diagram shown in FIG. 3. As shown in FIG. 3, the communication system 1 according to this embodiment includes the camera 11, the microphone 12, a drive unit 13, the display 14, a speaker 15, and the control unit 10.

The camera 11 shown in the block diagram of FIG. 3 corresponds to the camera 11 provided in the nose part 33 of the communication system 1 shown in FIG. 1. The camera 11 photographs a space in front of the communication system 1 (specifically, a user who is a communication partner) and provides the photographed image data to the control unit 10.

The microphone 12 shown in the block diagram of FIG. 3 corresponds to the microphones 12a and 12b provided in the ear parts 31a and 31b of the communication system 1 shown in FIG. 1. The microphone 12 picks up sounds (in particular, a voice of a user) around the communication system 1 and provides the picked-up voice signals to the control unit 10. For example, the microphone 12 includes a plurality of microphones (e.g., nondirectional microphones), and the control unit 10 can form the beam-forming 45 (see FIG. 2) having directivity in the specific direction 41 by performing beamforming processing on the voice signals picked up by the plurality of microphones.

The drive unit 13 drives the head part 100. Specifically, the drive unit 13 drives the head part 100 in accordance with a control signal provided from the control unit 10. For example, the drive unit 13 can drive the head part 100 so that the head part 100 faces downward or upward and faces left or right. Further, the drive unit 13 may drive the head part 100 so that the head part 100 faces in an oblique direction. For example, the drive unit 13 can be configured using a servo motor or the like.

The display 14 shown in the block diagram of FIG. 3 corresponds to the displays 14a and 14b provided in the eye parts 32a and 32b of the communication system 1 shown in FIG. 1. The display 14 is configured so as to display the eye images 34a and 34b (see FIG. 1) corresponding to the control signal provided from the control unit 10. That is, the control unit 10 controls a direction of the line of sight of the communication system 1 by controlling the eye images 34a and 34b (see FIG. 1) displayed on the respective displays 14a and 14b.

The speaker 15 outputs a sound corresponding to the voice signal provided from the control unit 10. This configuration enables the communication system 1 to talk to a user (a communication partner).

The control unit 10 performs various types of controls of the communication system 1. Specifically, the control unit 10 receives image data from the camera 11 and receives a voice signal from the microphone 12. Further, the control unit 10 outputs a control signal corresponding to the amount of movement of the head part 100 to the drive unit 13. Further, the control unit 10 outputs, to the display 14, a control signal for displaying an eye image on the display 14. Further, the control unit 10 outputs, to the speaker 15, a voice signal for outputting a voice from the speaker 15.

Further, in the communication system 1 according to this embodiment, the control unit 10 identifies a position of the mouth of a user using an image taken by the camera 11, and control a position of the head part 100 so that the identified position of the mouth of the user is included in a region of the beam-forming of the microphone 12.

Specifically, as shown in FIG. 3, the control unit 10 includes a position identification unit 21, a movement amount calculation unit 22, and a control signal output unit 23. The position identification unit 21 identifies a position of the mouth of a user using an image of the user taken by the camera 11. At this time, the position identification unit 21 may calculate the coordinates of the position of the mouth of the user using the image of the user taken by the camera 11.

The movement amount calculation unit 22 calculates the amount of movement of the head part 100 when the position of the head part 100 is moved so that the position of the mouth of the user is included in the region of the beam-forming of the microphone 12. For example, the movement amount calculation unit 22 may calculate the amount of movement of the head part 100 using the coordinates of the position of the mouth of the user and the relative positional relation between the microphone 12 and the camera 11. Note that a specific method for calculating the amount of movement of the head part 100 will be described later.

The control signal output unit 23 generates a control signal corresponding to the amount of movement of the head part 100 calculated by the movement amount calculation unit 22 (i.e., a control signal of the drive unit 13) and outputs the generated control signal to the drive unit 13.

Further, in the communication system 1 according to this embodiment, the control unit 10 may be configured so that it can control a direction of the line of sight of the eye part 32 provided in the head part 100. For example, the control unit 10 may control the direction of the line of sight so as to face in the direction of the face of a user when the control unit 10 controls the position of the head part 100.

Further, the control unit 10 may identify the position of the face of a user using the image of the user taken by the camera 11 and control the direction of the line of sight so as to face in the direction of the face of the user. Furthermore, the control unit 10 may control the direction of the line of sight based on the amount of movement of the head part 100 when the control unit 10 controls the position of the head part 100.

Figure 4:
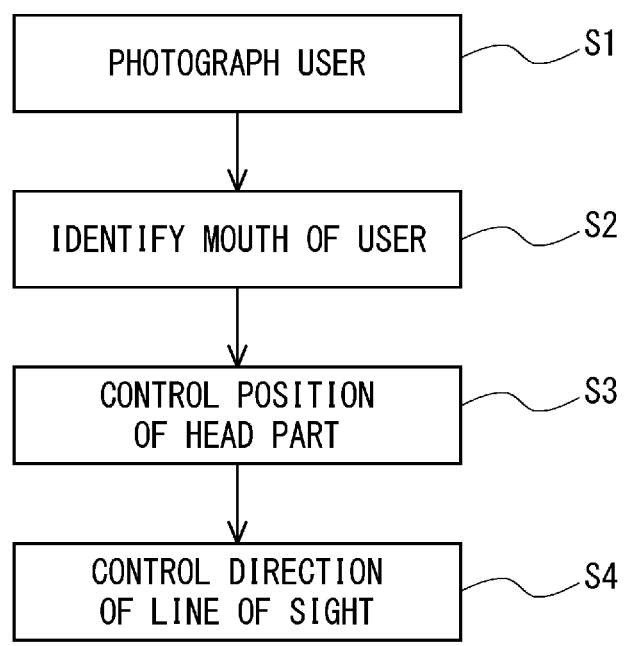
FIG. 4 is a flowchart for explaining an operation of the communication system according to the embodiment.
Figure 5:
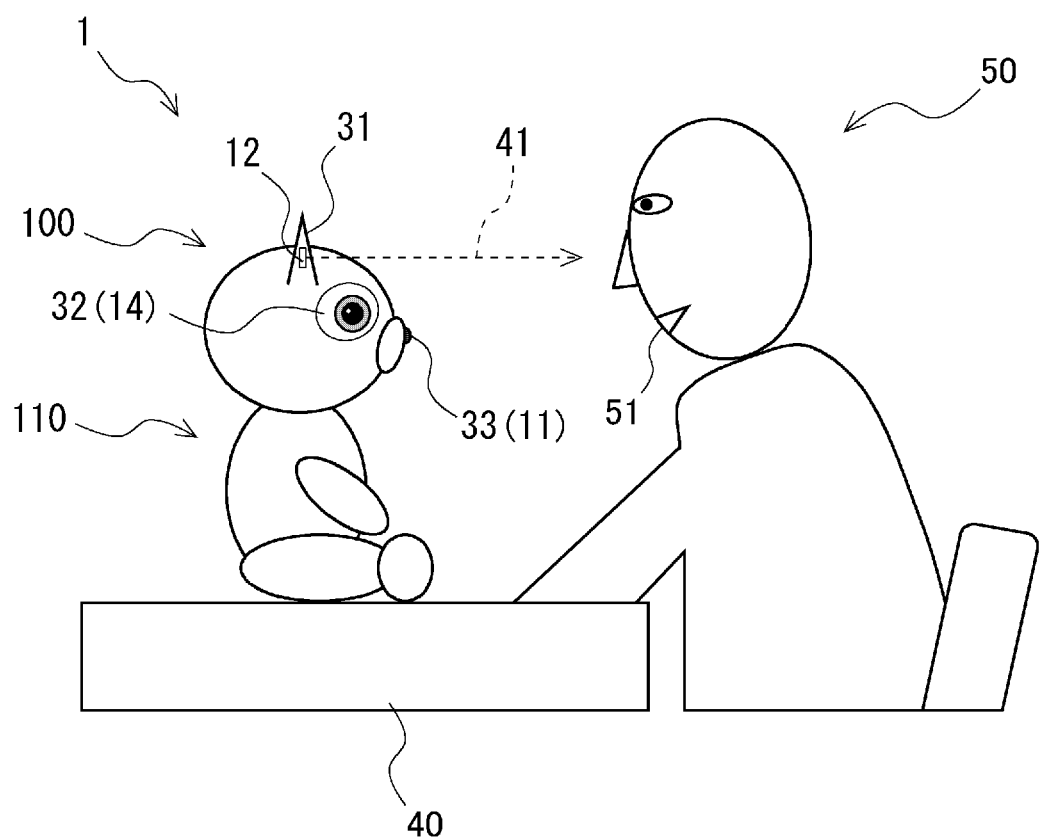
FIG. 5 is a side view for explaining an operation of the communication system according to the embodiment.
Figure 6:
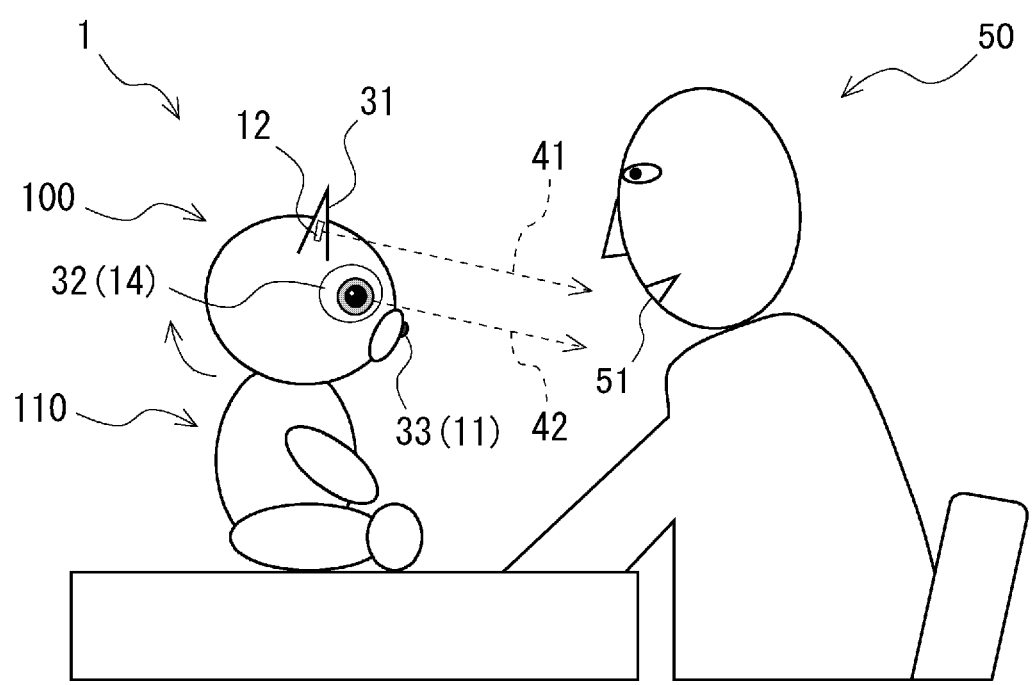
FIG. 6 is a side view for explaining an operation of the communication system according to the embodiment.
Figure 7:
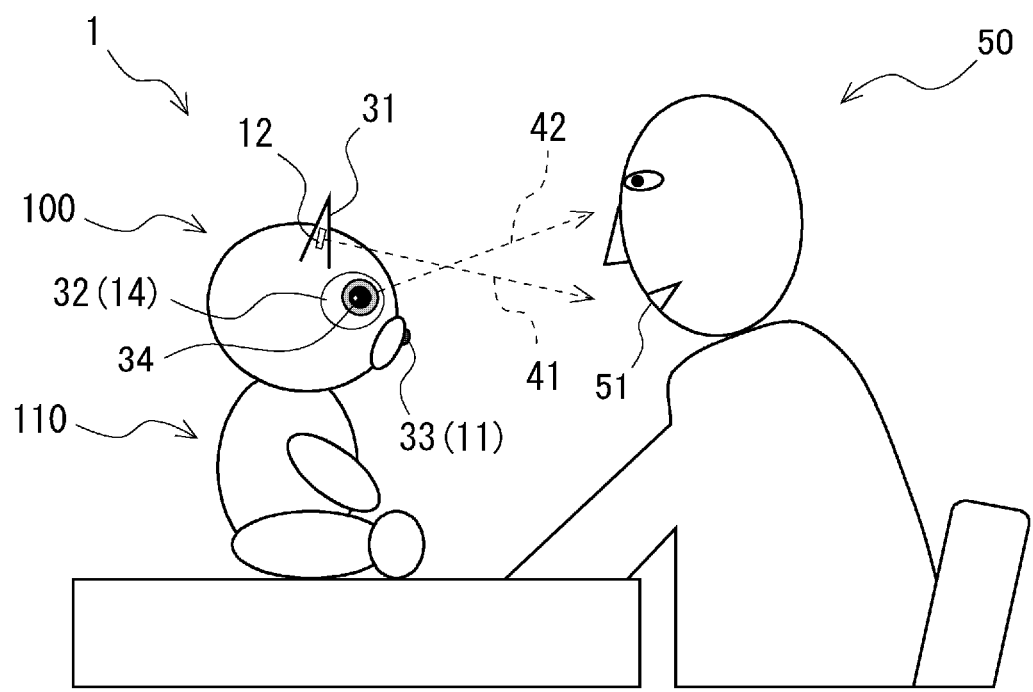
FIG. 7 is a side view for explaining an operation of the communication system according to the embodiment.

Next, an operation of the communication system according to this embodiment is described. FIG. 4 is a flowchart for explaining the operation of the communication system according to this embodiment. FIGS. 5 to 7 are side views for explaining the operation of the communication system according to this embodiment. In the following description, a case where the communication system 1 is placed on a table 40 and a user 50 and the communication system 1 face each other is described as an example.

First, the communication system 1 photographs the user 50 who is a communication partner (Step S1 in FIG. 4). Specifically, as shown in FIG. 5, the communication system 1 photographs the user 50 using the camera 11 provided in the nose part 33 thereof. Note that at this time, the center direction 41 of the beam-forming of the microphone 12 faces a position above the position of a mouth 51 of the user 50.

Figure 8:
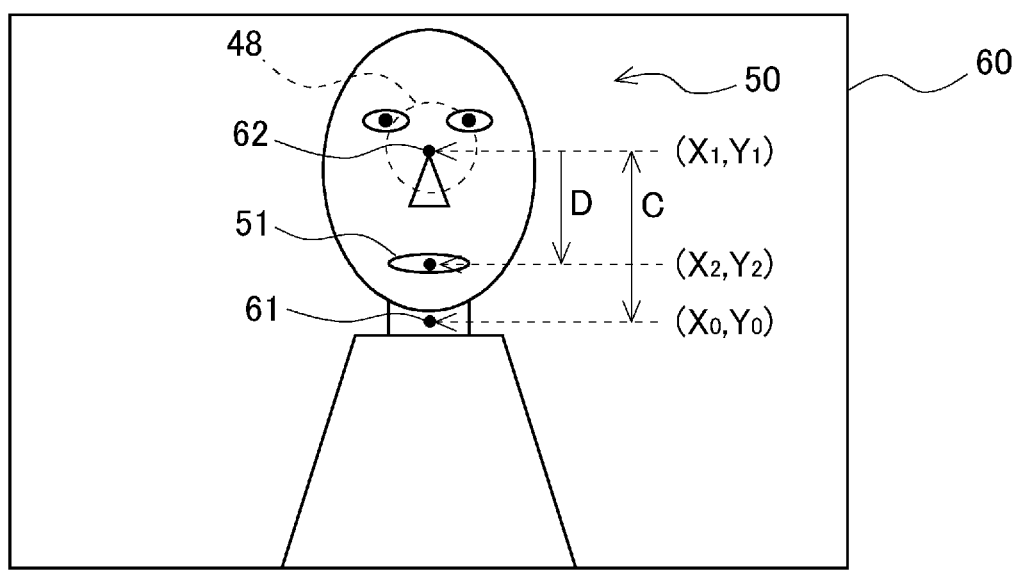
FIG. 8 is a diagram for explaining an operation of the communication system according to the embodiment.

Next, the communication system 1 identifies the position of the mouth 51 of the user 50 using the image of the user 50 photographed in Step S1 (Step S2 in FIG. 4). That is, the position identification unit 21 (see FIG. 3) of the control unit 10 identifies the position of the mouth 51 of the user 50 by performing image processing on a photographed image 60 since the user 50 is in the photographed image 60 as shown in FIG. 8. For example, the position identification unit 21 obtains $(X_2, Y_2)$ of the position of the mouth 51 of the user 50.

To be more specific, the position identification unit 21 performs processing for detecting a face on the photographed image 60 to identify the face of the user 50. After that, the position identification unit 21 partially extracts the lips from the identified face of the user 50. As a method for extracting the lips, a part of an area included in the contour of the face that substantially matches a plurality of lip data stored in advance is recognized as lips, and the recognized part can be extracted as lips of the face. Further, the position identification unit 21 identifies the center of gravity position of the contour of the lips extracted as described above as the center point of the lips, that is, the center coordinates $(X_2, Y_2)$ of the mouth 51 of the user 50.

Next, the communication system 1 controls a position of the head part 100 so that the identified position of the mouth 51 of the user 50 is included in a region of the beam-forming (Step S3 in FIG. 4). That is, as shown in FIG. 6, the communication system 1 controls the position of the head part 100 thereof so as to face downward. Accordingly, the center direction 41 of the beam-forming of the microphone 12 faces the direction of the mouth 51 of the user 50. Thus, the position of the mouth 51 of the user 50 is included in the region of the beam-forming.

For example, the movement amount calculation unit 22 (see FIG. 3) of the control unit 10 calculates the amount of movement of the head part 100 of the communication system 1 by using the coordinates of the position of the mouth 51 of the user 50 and the relative positional relation between the microphone 12 and the camera 11.

Specifically, as the microphone 12 and the camera 11 are fixed to the head part 100, the relative positional relation between the microphone 12 and the camera 11 is fixed. Accordingly, as shown in FIG. 8, it is possible to calculate, in the photographed image 60, the relative positional relation between a center position 61 of the camera and a center position 62 (a position where the center direction 41 of the beam-forming is projected onto the user 50) of the beam-forming by using the distance between the communication system 1 and the user 50.

Figure 9:
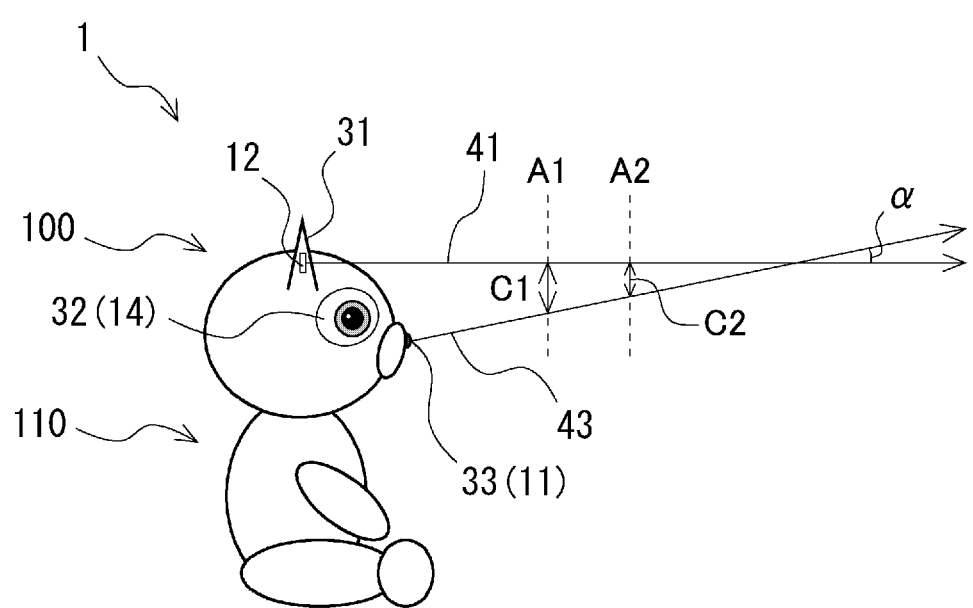
FIG. 9 is a diagram for explaining an operation of the communication system according to the embodiment.

That is, it is possible to obtain the center position 62 $(X_1, Y_1)$ of the beam-forming with respect to the center position 61 $(X_0, Y_0)$ of the camera shown in FIG. 8 by using the distance between the communication system 1 and the user 50 since an angle α formed by a center direction 43 of the camera 11 and the center direction 41 of the beam-forming is fixed as shown in FIG. 9.

For example, in the example shown in FIG. 9, when the position of the user 50 with respect to the communication system 1 is a position A1, a distance C between the center position 61 of the camera and the center position 62 of the beam-forming shown in FIG. 8 is C1. Similarly, when the position of the user 50 with respect to the communication system 1 is a position A2 (see FIG. 9), the distance C between the center position 61 of the camera and the center position 62 of the beam-forming shown in FIG. 8 is C2. In this way, it is possible to obtain the distance C between the center position 61 of the camera and the center position 62 of the beam-forming by using the distance between the communication system 1 and the user 50.

It should be noted that the distance between the communication system 1 and the user 50 may be estimated using the size of the photographed image of the face of the user 50, or the distance between the communication system 1 and the user 50 may be separately measured using a sensor such as a distance sensor or a three-dimensional position measurement sensor. When the distance between the communication system 1 and the user 50 is estimated using the size of the image of the face of the user, correlation data between the size of the image of the face of the user with an average face size on the camera image and the distance between the communication system 1 and the user 50 is input in advance. Then, it is possible to estimate the distance to a user based on the size of the image of the face of the user on the camera image taken by the camera 11 and the correlation data input in advance.

Note that when the center direction of the camera 11 and the center direction 41 of the beam-forming are parallel to each other, the relative positional relation between the center position 61 of the camera and the center position 62 of the beam-forming in the image 60 becomes constant.

As shown in FIG. 8, the coordinates of the center position 61 of the camera are $(X_0, Y_0)$, the coordinates of the center position 62 of the beam-forming are $(X_1, Y_1)$, and the center coordinates of the position of the mouth 51 of the user 50 are $(X_2, Y_2)$. Accordingly, in this case, an amount D of movement of the head part 100 of the communication system 1 is $(X_2-X_1, Y_2-Y_1)$.

By using such a method, the movement amount calculation unit 22 (see FIG. 3) of the control unit 10 can calculate the amount D of movement of the head part 100 of the communication system 1. Further, the control signal output unit 23 generates a control signal (i.e., a control signal of the drive unit 13) corresponding to the amount D of movement of the head part 100 calculated by the movement amount calculation unit 22 and outputs the control signal to the drive unit 13. Then, the drive unit 13 is driven in accordance with this control signal, so that the head part 100 is moved by the amount D of movement.

Note that in the above description, the case where the center direction 41 of the beam-forming of the microphone 12 is controlled so as to face in the direction of the mouth 51 of the user 50 has been explained. However, in this embodiment, the center direction 41 of the beam-forming does not necessarily have to face in the direction of the mouth 51 of the user 50 if the mouth 51 of the user 50 is included in the region of the beam-forming.

That is, in FIG. 8, a bottom surface 48 of the beam-forming 45 having a substantially conical shape shown in FIG. 2 has a substantially circular shape (a shape obtained by projecting the beam-forming 45 having a substantially conical shape onto the user 50) with the center position 62 of the beam-forming as the center. Accordingly, in this embodiment, the control does not necessarily have to be performed so that the center direction 41 of the beam-forming coincides with the position of the mouth 51 of the user 50 if the position of the mouth 51 of the user 50 is included in the bottom surface 48 of the beam-forming.

Next, the communication system 1 controls the direction of the line of sight thereof so as to face in the direction of the face of the user 50 (Step S4 in FIG. 4). As shown in FIG. 6, when the head part 100 of the communication system 1 is moved so that the center direction 41 of the beam-forming of the microphone 12 faces the direction of the mouth 51 of the user 50, a direction 42 of the line of sight of the communication system 1 is moved along with this movement of the head part 100. As a result, the direction 42 of the line of sight of the communication system 1 deviates from the face of the user 50.

As described above, if the direction 42 of the line of sight of the communication system 1 deviates from the face of the user 50, an impression may be given to the user 50 that the communication system 1 is not listening to him/her. In this embodiment, as shown in FIG. 7, it is possible to prevent the impression that the communication system 1 is not listening to the user 50 from being given to the user 50 by controlling the direction 42 of the line of sight so that it faces the direction of the face of the user 50 (e.g., the position of the eyes). In other words, it is possible to give an impression to the user 50 that the communication system 1 is carefully listening to him/her.

For example, the control unit 10 may identify the position of the face of the user using the image of the user taken by the camera 11 and control the direction of the line of sight so as to face in the direction of the face of the user. Specifically, as shown in FIG. 8, the control unit 10 identifies the position of the face of the user 50 by performing image processing on the photographed image 60. For example, the control unit may identify the positions of both eyes of the user 50 by performing image processing on the photographed image 60, and the position of the center of both eyes may be used as a target position. The control unit 10 displays the eye image 34 on the display 14 so that the direction of the line of sight of the communication system 1 faces the target position.

Further, the control unit 10 may control the direction of the line of sight based on the amount of movement of the head part 100 when the control unit controls the position of the head part 100. Specifically, in a case where the direction of the line of sight of the communication system 1 is adjusted to the user 50 in advance in the initial state shown in FIG. 5, when the head part 100 of the communication system 1 is moved, the direction 42 of the line of sight of the communication system 1 is also moved as shown in FIG. 6. This amount of movement of the direction 42 of the line of sight corresponds to the amount D of movement of the head part 100 shown in FIG. 8. Accordingly, the control unit 10 can adjust the direction 42 of the line of sight to the user 50 by using the amount D of movement of the head part 100. That is, the control unit 10 performs processing for returning the line of sight upward by the amount D of movement of the head part 100.

Further, the control unit 10 may control the direction of the line of sight by using the image of the user taken by the camera 11 in combination with the amount of movement of the head part 100 when the control unit 10 controls the position of the head part 100.

Note that the processing (the processing for controlling the direction of the line of sight) in Step S4 may be performed simultaneously with the processing (processing for controlling the position of the head part 100) in Step S3. By simultaneously performing the control of the position of the head part 100 (Step S3) and the control of the direction of the line of sight (Step S4) as described above, it is possible to achieve a natural operation of the communication system 1.

Further, the processing (the processing for controlling the direction of the line of sight) in Step S4 may be omitted as appropriate. For example, the processing in Step S4 may be omitted when the user 50 does not have a feeling of strangeness even if the line of sight of the communication system 1 is not moved in the processing (processing for controlling the position of the head part 100) in Step S3, such as when the amount D of movement of the head part 100 is small.

As described above, in the communication system 1 according to this embodiment, the camera 11 configured to be able to photograph a user who is a communication partner and a microphone 12 configured to be able to form a beam-forming in a specific direction are provided in the head part 100 of the communication system 1. Thus, it is possible to omit a holding unit that holds the microphone, and accordingly to make the apparatus configuration of the communication system 1 simple.

Further, in the communication system 1 according to this embodiment, a user who is a communication partner is photographed and the position of the mouth of the user is identified using the photographed image of the user. Then, the position of the head part is controlled so that the identified position of the mouth of the user is included in a region of the beam-forming of the microphone 12. In this embodiment, the position of the mouth of the user is included in the region of the beam-forming of the microphone 12 as described above, and thus it is possible to accurately recognize a voice of the user.

Therefore, according to the disclosure of this embodiment, it is possible to provide a communication system that has a simple apparatus configuration and that can accurately recognize a voice of a user, and a method for controlling the communication system.

Further, in the communication system 1 according to this embodiment, the direction of the line of sight is controlled so as to face in the direction of the face of a user. Thus, it is possible to prevent the line of sight of the communication system 1 from deviating from the face of the user when the position of the head part 100 is moved. Accordingly, it is possible to give an impression (feeling of closeness) to the user 50 that the communication system 1 is listening to him/her.

Note that in the operation of the communication system 1 described with reference to FIG. 5 to 8, the operation in which the communication system 1 faces downward has been described as examples. However, in this embodiment, the communication system 1 may be configured so that the head part 100 thereof faces upward, faces left or right, and further faces in an oblique direction.

Further, in this embodiment, the communication system 1 may be configured so that when it moves the head part 100, it also moves the arm parts 37a and 37b. For example, as shown in FIGS. 6 and 7, when the communication system 1 turns the head part 100 downward, the communication system 1 may move the arm parts 37a and 37b upward so that the tips of the arm parts 37a and 37b approach the ear parts 31a and 31b. By doing so, it is possible to have the communication system 1 make a gesture indicating that it is carefully listening to a user.

Further, for example, when the volume of the voice of a user is lower than a predetermined volume, it is possible to inform the user that the voice of the user is quiet by having the communication system 1 perform an operation in which the tips of the arm parts 37a and 37b approach the ear parts 31a and 31b.

The above description shows, as an example, the configuration in which the camera 11 is provided in the nose part 33 of the communication system 1 and the microphones 12a and 12b are provided in the ear parts 31a and 31b thereof. However, in this embodiment, positions where the camera 11 and the microphone 12 are provided are not limited to the above positions, and the camera 11 and the microphone 12 can be attached to any position. The present disclosure can be suitably used particularly for a small communication system (robot). Therefore, the camera 11 and the microphone 12 may be arranged at positions close to each other.

Further, in the above description, the communication system 1 that does not independently walk has been described. However, in this embodiment, the communication system 1 may be configured so that it can independently move.

Figure 10:
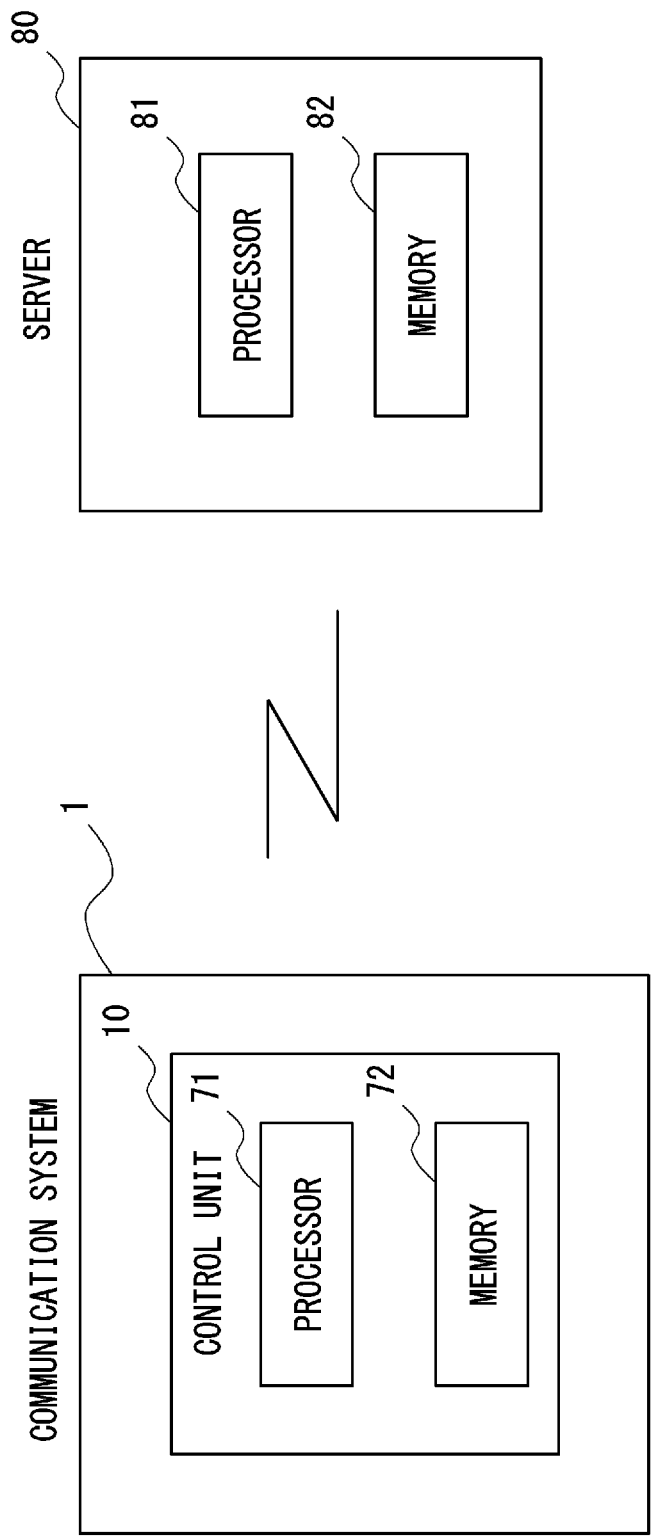
FIG. 10 is a block diagram showing a hardware configuration of the communication system according to the embodiment.

FIG. 10 is a block diagram showing a hardware configuration of the communication system according to this embodiment. The control unit 10 of the communication system 1 according to this embodiment includes a processor 71 and a memory 72. Further, a program stored in the memory 72 (i.e., a program that can implement the operation of the control unit 10) is executed by the processor 71, so that the above-described operation of the control unit 10 can be implemented. Note that in FIG. 10, the components other than the control unit 10 are omitted.

Further, in the communication system according to this embodiment, a part of the operation of the control unit 10 may be performed in a server 80 (e.g., a cloud server). The server 80 includes a processor 81 and a memory 82. Further, a program stored in the memory 82 (i.e., a program that can perform the operation of the control unit 10) is executed by the processor 81, so that a part of the operation of the control unit 10 can be performed in the server 80. The communication system 1 is connected to the server 80 through a network line.

For example, the operation of the position identification unit 21 (see FIG. 3) among the operations of the control unit 10 may be performed in the server 80. That is, processing for identifying the position of the mouth of the user using the photographed image of the user may be performed in the server 80. In this case, the communication system 1 transmits the image taken by the camera 11 to the server 80. At this time, the communication system 1 may cut out the background image from the photographed image and transmit it to the server 80 in order to reduce the capacity of the data to be transmitted (i.e., the communication system 1 may transmit only the part of the image that shows a user to the server 80).

Then, the server 80 performs image processing on the received image and identifies the position of the mouth of the user. After that, the server 80 transmits information about the identified position of the mouth (the coordinates of the position of the mouth) to the communication system 1. The control unit 10 of the communication system 1 performs processing for calculating the amount of movement by using the received information about the position of the mouth. The subsequent operations are the same as those of the above-described communication system 1, and a duplicate description is thus omitted.

Further, the server 80 may be connected to a plurality of communication systems 1 through a network line. By such a configuration, the plurality of communication systems 1 can be controlled (managed) using the common server 80.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A communication system, comprising:
a main body part;
a head part attached to the main body part so that the head part can be displaced with respect to the main body part;
an eye part provided in the head part;
a control unit configured to be able to control a position of the head part with respect to the main body part and to be able to control a direction of a line of sight of the eye part;
a camera provided in the head part and configured to be able to photograph a user who is a communication partner; and
a microphone provided in the head part and configured to be able to form a beam-forming in a specific direction, wherein
the control unit controls the direction of the line of sight of the eye part so as to face in a direction of a face of the user in advance, and identifies a position of a mouth of the user using an image of the user taken by the camera and controls the position of the head part so that the identified position of the mouth of the user is included in a region of the beam-forming; and
when the head part is moved and the direction of the line of sight deviates from the face of the user, the control unit adjusts the direction of the line of sight to face in the direction of the face of the user by using an amount of movement of the head part when the control unit controlled the position of the head part.

2. The communication system according to claim 1, wherein the control unit:
calculates coordinates of the position of the mouth of the user using the image of the user taken by the camera; and
calculates the amount of movement of the head part using the calculated coordinates of the position of the mouth and a relative positional relation between the microphone and the camera.

3. A method for controlling a communication system, the communication system comprising:
a main body part;
a head part attached to the main body part so that the head part can be displaced with respect to the main body part;
an eye part provided in the head part;
a camera provided in the head part; and
a microphone provided in the head part and configured to be able to form a beam-forming in a specific direction, the method comprising:
photographing a user who is a communication partner by using the camera;
controlling a direction of a line of sight of the eye part so as to face in a direction of a face of the user in advance;
identifying a position of a mouth of the user using the photographed image of the user;

controlling a position of the head part so that the identified position of the mouth of the user is included in a region of the beam-forming; and when the head part is moved and the direction of the line of sight deviates from the face of the user, adjusting the direction of the line of sight to face in the direction of the face of the user by using an amount of movement of the head part when the position of the head part is controlled.

4. The communication system according to claim 1, further comprising arm parts attached to the main body part, and the control unit is further configured to move the arm parts while controlling the position of the head part so as to indicate that the communication system is listening to the user.

5. The method for controlling the communication system according to claim 3, further comprising moving arm parts attached to the main body part while controlling the position of the head part so as to indicate that the communication system is listening to the user.

* * * * *